Patented May 3, 1949

2,469,348

UNITED STATES PATENT OFFICE 2,469,348

CELLULOSE DERIVATIVE COMPOSITIONS

Arthur E. Young and Elmer K. Stilbert, Midland, Mich., assignors to The Dow Chemical Company, Midland, Mich., a corporation of Delaware No Drawing. Application April 7, 1945, Serial No. 587,220

8 Claims. (Cl. 260—16)

This invention relates to a cellulose derivative composition, to a method whereby the same may be used and to the products thereby obtained. It relates in particular to a composition which is suitable for coating lightweight fabrics without appreciably changing the drape and hand of the fabric.

Numerous compositions have been suggested for use in coating fabrics of various types. Many of these compositions contain cellulose derivatives and plasticizers and some of them contain as well various amounts of natural or synthetic resins. When fabrics are coated with most of the heretofore described compositions and the coating is dried, it is found that considerable stiffness is imparted to the fabric. In many cases this is not objectionable, but it is apparent that a composition which could at the same time afford the desired protection to the fabric and not change the drape and hand of the fabric would represent a marked improvement over the previously known compositions. This is especially true in the case of compositions intended primarily for use in coating such lightweight fabrics as silk, for example.

It is accordingly an object of the present invention to provide a composition of matter suitable for coating lightweight fabrics to provide water repellent finishes without changing materially the drape and hand of the fabric. A related object is to provide such a composition which is non-tacky when dried. A further object is to provide a method whereby such a composition may be applied to lightweight fabrics to provide the desired protection to such fabrics. Yet another object is the provision of coated lightweight fabrics having substantially the same drape and hand as the uncoated material but characterized by an improved repellency for water.

It has been found that the foregoing and related objects may be attained through the use of a particularly type of cellulose derivative composition, which will be described more fully hereinafter, and which contains non-volatile ingredients consisting essentially of from 45 to 65 per cent by weight of a particular type of soft alkyd resin; from 25 to 40 per cent of a cellulose derivative which is soluble in organic solvents; from 1 to 5 per cent of a thermosetting resin and from 5 to 20 per cent of a solvent plasticizer for the cellulose derivative. The composition may contain volatile solvents, which may be selected as appropriate for the particular cellulose derivative employed, to serve as a medium while applying the non-volatile ingredients to the fabric. The particular ingredients, which have been found useful and which have been named in general terms in the foregoing description of the composition, will now be described and defined individually to enable one skilled in the art to prepare the composition and to obtain the benefits which accrue to the use of such a composition when coating fabrics.

The alkyd type resin for use in the composition is a reaction product of a polyhydric alcohol having 3 or more hydroxyl groups and a straight chain dicarboxylic aliphatic acid having 4 or more carbon atoms. Examples of the polyhydric alcohols which may be used for preparing such resins are glycerol, the mono ethers of glycerol, sorbitol, pentaerythritol, mannitol, and the like. The straight chain dicarboxylic acids which may be used in the preparation of the alkyd resins include succinic acid, having four carbon atoms; glutaric acid, with five carbon atoms; adipic acid, with six carbon atoms; pimelic acid, with seven carbon atoms; suberic acid, with eight carbon atoms; azelaic acid, with nine carbon atoms; sebacic acid, with ten carbon atoms, and the corresponding acids having twelve, fourteen, or even more carbon atoms in a straight chain. Numerous alkyd resins of the type above-defined are commercially available. They lend softness, flexibility and elasticity to cellulose derivative compositions when employed in relatively large proportions but it has been found that compositions of such resins and cellulose derivatives alone tend to be tacky if sufficient of the resin is employed to provide softness. It has also been found that cellulose derivatives to which have been added small amounts of such resins tend to stiffen lightweight fabrics much more than is desirable, even when the composition is non-tacky.

The cellulose derivative for use in the present composition should be one which is soluble in organic solvents and may be either a cellulose ester or a cellulose ether. Examples of the commercial cellulose esters which may be so employed include nitrocellulose, cellulose acetate, cellulose acetobutyrate, and the like. Of the various cellulose ethers which are adapted for use in the invention, the standard ethyl cellulose of commerce is preferred.

Because of the tendency for the herein-preferred alkyd resins to form tacky compositions with cellulose derivatives when employed in sufficient quantity to give soft compositions, an ingredient is added to the present composition to eliminate tackiness from the deposited coating. This ingredient, referred to above as a thermosetting resin, is more specifically a resin of the class consisting of the urea-formaldehyde and melamine-formaldehyde resins which are soluble in organic solvents but convertible when heated to a non-tacky and insoluble form. Numerous such resins are commercially available.

As the final ingredient of the composition there is employed from 5 to 20 per cent of a solvent type plasticizer for the cellulose derivative. Numerous such plasticizers exist and are well known in the art. Examples of such plasticizers which have been found particularly advantageous for use in the composition include toluene sulfonamide, and the alkyl phthalyl alkyl glycollates. These plasticizers exert a common solvent action on the other non-volatile ingredients, and serve to prevent haze in films and coatings of the composition.

Many of the alkyd resins hereinabove defined have previously been employed in cellulose derivative compositions and a description of such compositions may be found, for example, in U. S. Patent No. 2,129,156. In the said patent no composition is disclosed containing more than about 35 per cent of the alkyd resin. We have found, however, that it is necessary to employ at least 45 per cent of such a resin if the composition is to provide protection to light weight fabrics without materially affecting the drape and hand of the fabric. When this larger amount of alkyd resin is employed and the composition is modified by the inclusion of the stated small percentage of a urea-formaldehyde or melamine-formaldehyde resin, a composition is obtained which has all of the strength and toughness usually associated with compositions having much less softening agent, and which, at the same time, contributes the desired properties to a coated fabric.

In applying the present composition, any of the normal coating methods may be employed such as dipping, doctoring, or roller coating, but it is found that after the volatile solvent ingredients have evaporated, a short heat treatment is necessary to set the urea-formaldehyde or melamine-formaldehyde ingredient and to make the composition completely non-tacky. Surprisingly enough, this treatment is not accompanied by any stiffening of the composition or of the coated article. The heating period which is referred to above, may be reduced to a minimum by incorporating in the composition catalytic amounts of the usual accelerators for the thermosetting resin employed, such as phosphoric acid.

The following examples illustrate the present invention:

Example I

A composition was prepared containing the following ingredients in the indicated proportions by weight: ethyl cellulose (medium viscosity; standard ethoxy) 30 parts; glyceryl succinic acid alkyd resin 58 parts; toluene sulfonamide 9 parts; urea-formaldehyde resin 3 parts. The above ingredients were dissolved in 140 parts of toluene and a film was cast from the solution on a glass plate for test purposes. When air dry, the film was weak and tacky but after two hours in an oven at 120° C. it was completely tack free, and was tough, resilient, soft, and very flexible.

Example II

Nitrocellulose (5 seconds) 26 parts; oil modified glyceryl sebacate 62 parts; toluene sulfonamide 10 parts; melamine-formaldehyde resin 2 parts, were dissolved together in a mixed solvent comprising 100 parts of toluene, 35 parts butyl acetate, 35 parts ethyl acetate, and 30 parts of ethanol. Films were cast and treated in the same manner as was described in Example I. After oven drying, this film also possessed the desired properties of toughness, resilience, flexibility, and softness.

Example III

A lightweight oiled silk was coated by dipping in a solution containing the following non-volatile ingredients: ethyl cellulose 33 per cent; glyceryl sebacate 47 per cent; methyl phthalyl ethyl glycollate 18 per cent; melamine-formaldehyde resin 2 per cent. The fabric was heated for two hours at 120° C. and held for comparison with other similarly treated samples.

Example IV

In a manner similar to that described in the preceding example, some of the same silk was coated with a composition, the non-volatile ingredients of which were those set forth in Example I. This article also was oven dried to the tack free state and was held for comparison with other coated fabrics.

Example V

Some of the same silk was coated in like manner with a composition outside of the range of the present invention, the non-volatile ingredients being 55 per cent ethyl cellulose and 45 per cent glyceryl sebacate. This sample was tack free when air dried. The products obtained from Examples III, IV, and V were compared with one another and with the uncoated blank. The products of Examples III and IV were soft, flexible and had substantially the same drape and hand as the uncoated silk. The article from Example V, however, was relatively stiff and, while not brittle, was unsatisfactory for most of the uses to which coated lightweight fabrics are put.

We claim:

1. A coating composition, the non-volatile ingredients of which consist essentially of from 45 to 65 per cent of an alkyd resin product of the reaction between a polyhydric alcohol containing at least 3 hydroxyl groups and a straight chain dicarboxylic aliphatic acid containing at least 4 carbon atoms; from 25 to 40 per cent of a cellulose derivative selected from the class consisting of the cellulose esters and cellulose ethers which are soluble in organic solvents; from 1 to 5 per cent of a resin selected from the class consisting of the thermosetting urea-formaldehyde and thermosetting melamine-formaldehyde resins which are soluble in organic solvents; and, from 5 to 20 per cent of a solvent plasticizer for the cellulose derivative, the said non-volatile ingredients being dissolved in a volatile organic solvent therefor, to provide a solution adapted for use in normal coating methods.

2. The composition as claimed in claim 1, wherein the alkyd resin is a glyceryl sebacate resin.

3. The composition as claimed in claim 1, wherein the cellulose derivative is a cellulose ester soluble in organic solvents.

4. The composition as claimed in claim 1, wherein the cellulose derivative is nitrocellulose soluble in organic solvents.

5. The composition as claimed in claim 1, wherein the cellulose derivative is a cellulose ether soluble in organic solvents.

6. The composition as claimed in claim 1, wherein the cellulose derivative is ethyl cellulose soluble in organic solvents.

7. A coating composition, the non-volatile ingredients of which consist essentially of from 45 to 65 per cent of a glyceryl sebacate resin; from 25 to 40 per cent of an ethyl cellulose which is soluble in organic solvents; from 1 to 5 per cent of a thermosetting urea-formaldehyde resin which is soluble in organic solvents; and, from 5 to 20 per cent of a solvent plasticizer for the ethyl cellulose, the said non-volatile ingredients being dissolved in a volatile organic solvent therefor, to provide a solution adapted for use in normal coating methods.

8. The composition as claimed in claim 7, wherein the solvent plasticizer is toluene sulfonamide.

ARTHUR E. YOUNG.
ELMER K. STILBERT.

REFERENCES CITED

The following references are of record in the file of this patent:

UNITED STATES PATENTS

| Number | Name | Date |
|---|---|---|
| 2,243,185 | Bacon et al. | May 27, 1941 |
| 2,381,878 | Cassel | Aug. 14, 1945 |
| 2,386,744 | Myers | Oct. 9, 1945 |